H. SAXLUND.
CUT-OFF VALVE FOR WATER SERVICE PIPES.
APPLICATION FILED APR. 13, 1918.
1,281,848.
Patented Oct. 15, 1918.
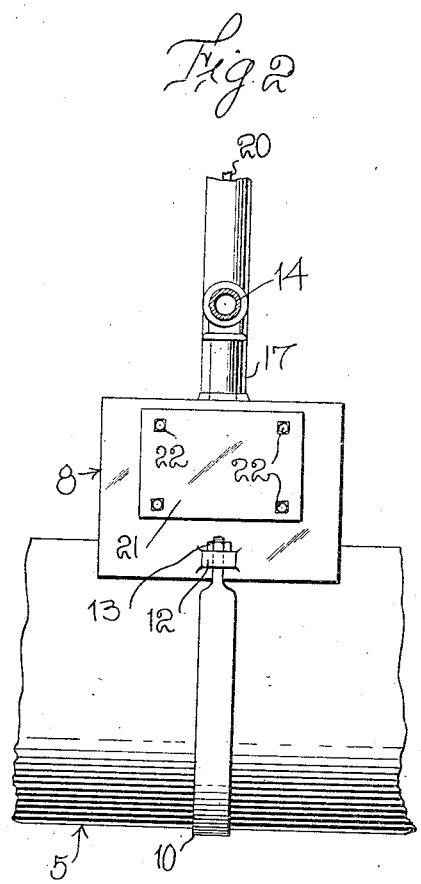
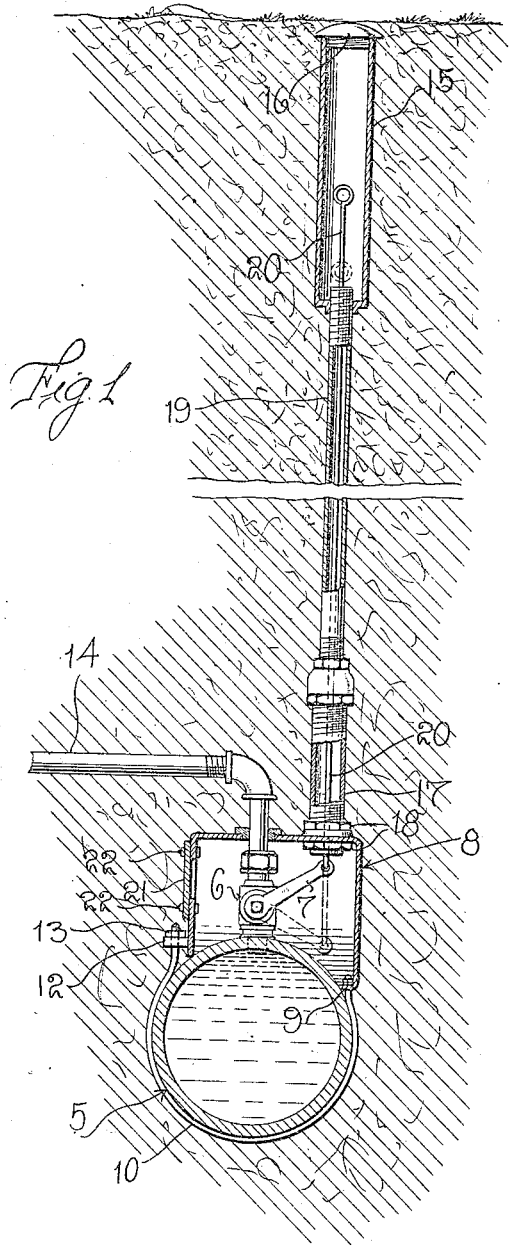
Inventor
Henry Saxlund
By Watson E. Coleman
Attorney

UNITED STATES PATENT OFFICE.

HENRY SAXLUND, OF LISBON, NORTH DAKOTA.

CUT-OFF VALVE FOR WATER-SERVICE PIPES.

1,281,848.

Specification of Letters Patent. Patented Oct. 15, 1918.

Application filed April 13, 1918. Serial No. 228,396.

*To all whom it may concern:*

Be it known that I, HENRY SAXLUND, a citizen of the United States, residing at Lisbon, in the county of Ransom and State of North Dakota, have invented certain new and useful Improvements in Cut-Off Valves for Water-Service Pipes, of which the following is a specification, reference being had to the accompanying drawings.

This invention relates to an improved cut-off valve for water service pipes and operating means therefor, and has for its primary object to provide a valve for cutting off the supply of water from the main water pipe or conduit to the house service pipe and means detachably secured upon the supply conduit for housing and protecting the valve.

It is another object of the invention to provide a valve operating rod extending at its upper end into a street service pipe, and a pipe connection between the valve housing and said street pipe, through which the operating rod is disposed.

It is also an additional object of the invention to provide an improved valve housing and means for clamping the same upon the water main or conduit, said housing having a plate removably mounted in one of its side walls to cover an opening affording access to the valve.

And it is a further general object of the invention to provide a device of the above character, which is simple in its construction, serviceable and convenient in practical use and may be manufactured and installed at comparatively small cost.

With the above and other objects in view the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1 is a vertical sectional view illustrating the preferred embodiment of the invention; and Fig. 2 is a side elevation of a section of the water main or conduit and the valve housing thereon.

Referring in detail to the drawing, 5 designates the water main or supply conduit into the top of which the valve casing 6 is tapped or threaded. A valve plug or cock of any ordinary or approved form is rotatably mounted in said casing and to one end of the same the arm 7 is fixed.

8 designates a metal housing or covering for the valve, and one side wall of this housing is inwardly flanged at its edge as at 9 for contact on the periphery of the water main 5 below and at one side of the valve. The opposite side wall of the housing engages at its edge upon the water main or conduit on the relatively opposite side of the valve. The end walls of this valve housing or casing are also properly formed so that they will closely fit upon the periphery of the water main. To the inturned flange 9, one end of a flexible band 10 is suitably attached. This band is adapted to extend around and under the water main 5 and the other end thereof is provided with a flexible stem or shank 11 for engagement through an apertured lug 12 on the opposite side wall of the housing 8. A suitable clamping nut 13 has threaded engagement upon the shank 11 whereby the flexible band 10 may be drawn around the water main and the edges of the housing walls securely clamped thereon.

The top wall of the housing is provided with an opening through which the house service pipe 14 extends, said pipe being coupled to the valve casing 6.

15 designates the street service pipe, the upper end of which is on a level with the ground surface, said upper end of the pipe being closed by the usual cap 16. One end of a pipe section 17 is secured in the top wall of the housing 8 by means of the lock nuts shown at 18 and to the other end of said pipe section a pipe 19 of relatively small diameter is coupled, the upper end of said latter pipe extending into the lower end of the street pipe 15.

The operating rod 20 for the valve extends through the pipes 17 and 19 and the upper end thereof projects upwardly into the street pipe 15. The lower end of this operating rod is connected to the end of the valve arm 7.

In Fig. 1 of the drawings, I have shown the valve in its open position. In case of a leak in the service pipe 14 or for any other reason it is desired to cut off the water supply, the cap 16 is removed from the upper end of the street pipe 15 and the rod 20 forced downwardly, thus rotating the valve to its closed position through the medium of the arm 7. In this manner, flooding of the premises may be prevented, as sometimes occurs when it is necessary to excavate the earth and uncover the water main. By the provision of the housing above referred to, the valve is entirely inclosed and protected so that the earth cannot collect thereon and interfere with the proper operation of the valve arm. However, I preferably provide one side wall of the housing 8 with an opening and a removable cover plate 21 therefor, said plate having marginal lugs apertured to receive the fastening bolts shown at 22. By removing this plate access may be conveniently had to the interior of the housing for the adjustment or repair of the valve.

From the foregoing description taken in connection with the accompanying drawing, the construction, manner of operation and several advantages of my invention will be clearly and fully understood. The device is very serviceable and convenient in practical use, and as it consists of relatively few parts of simple form it is manifest that the invention can be manufactured and installed at relatively small cost. While I have herein shown and described the preferred form, construction and relative arrangement of the several parts, it is to be understood that the device is susceptible of considerable modification therein and I, therefore, reserve the privilege of adopting all such legitimate changes as may be fairly embodied within the spirit and scope of the invention as claimed.

I claim:—

1. The combination with a water supply conduit, a house service pipe having a valved connection with said circuit, of a housing for said valve, means for clamping said housing on the conduit, and means for operating the valve from the street extending into said housing.

2. The combination with a water supply conduit, house service pipe and a valve connecting the pipe to said conduit, of a housing for the valve, means for detachably clamping the housing upon the conduit, a rod operatively connected to said valve and operable from the street, and guide means for said rod connected to the top wall of the housing.

3. The combination with a water supply conduit, a house service pipe and a valve connecting said pipe to the conduit, of a rectangular housing for said valve open at its lower side, the walls of the housing being seated upon the periphery of the conduit, one side wall of the housing having an inturned flange, a flexible clamping element permanently connected at one of its ends to said flange and adapted to extend under the conduit, means for detachably connecting the other end of said element to the opposite side wall of the housing, and means for actuating said valve extending into the housing and operable from the street.

4. The combination with a water supply conduit, a house service pipe and a valve connecting said pipe to the conduit, of a rectangular housing for said valve open at its lower side, the walls of the housing being seated upon the periphery of the conduit, one side wall of the housing having an inturned flange, a flexible clamping element permanently connected at one of its ends to said flange and adapted to extend under the conduit, means for detachably connecting the other end of said element to the opposite side wall of the housing, a guide pipe connected at its lower end to the top wall of the housing, and a rod extending through said pipe and operatively connected to the valve, said rod being operable from the street.

5. The combination with a conduit, house service pipe, and a valve connecting said pipe to the conduit, said valve having an arm, of a housing inclosing the valve and its arm, means for detachably clamping the housing upon the wall of the conduit, said housing having an opening in one of its walls affording access to the interior thereof, and actuating means for the valve connected to said arm and operable from the street.

In testimony whereof I hereunto affix my signature in the presence of two witnesses.

HENRY SAXLUND.

Witnesses:
C. O. HECKLE,
ADA E. SPERRY.

Copies of this patent may be obtained for five cents each, by addressing the "Commissioner of Patents, Washington, D. C."